No. 639,000. Patented Dec. 12, 1899.
W. V. THRELFALL.
YIELDING BEARING FOR SPINDLE SHAFTS OF ROVING MACHINES.
(Application filed June 15, 1899.)
(No Model.)
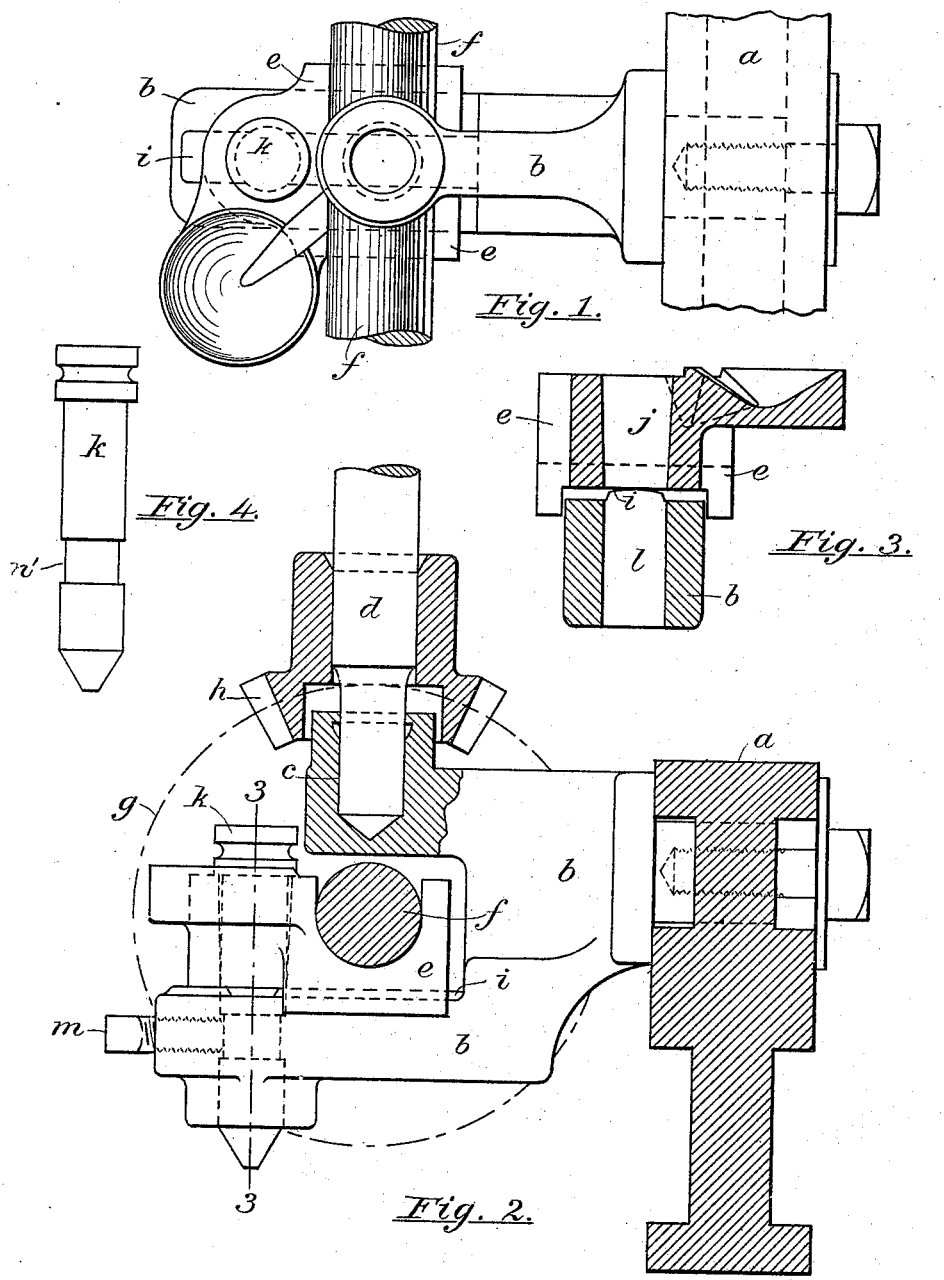
WITNESSES:
Sam'l G. Stephens.
Annie J. Dailey.
INVENTOR.
William V. Threlfall,
BY Crossley & Goddard,
ATTORNEYS.

UNITED STATES PATENT OFFICE.

WILLIAM V. THRELFALL, OF BIDDEFORD, MAINE, ASSIGNOR TO THE SACO & PETTEE MACHINE SHOPS, OF SAME PLACE AND NEWTON, MASSACHUSETTS.

YIELDING BEARING FOR SPINDLE-SHAFTS OF ROVING-MACHINES.

SPECIFICATION forming part of Letters Patent No. 639,000, dated December 12, 1899.

Application filed June 15, 1899. Serial No. 720,604. (No model.)

*To all whom it may concern:*

Be it known that I, WILLIAM V. THRELFALL, of Biddeford, in the county of York and State of Maine, have invented certain new and useful Improvements in Yielding Bearings for Spindle-Shafts of Roving-Machines, of which the following is a description sufficiently full, clear, and exact to enable those skilled in the art to which it appertains or with which it is most nearly connected to make and use the same.

This invention has special reference to roving-frames and similar machines employed in the textile-manufacturing art, its object being to so improve the bearings of the spindle-shaft—that is, the shaft from which the spindles are directly driven—that the said shaft may not become bound in its bearings, or any of them.

The spindle-shaft is provided along its length at each spindle in the line with a bevel-gear which meshes with and drives a bevel-gear secured to the spindle. The said shaft also of necessity has numerous bearings along its length to hold the gears in mesh and secure correct operation of the machine. It is well known to those skilled in the art that it is difficult to secure and maintain a perfect alinement of the spindle-shaft with all of its bearings and that when the alinement is not perfect undue power is required to run the machine, and it also becomes impossible to operate those parts which have to deal with the final acts of forming the roving and the winding of it upon the bobbin with that steadiness requisite to the performance of a perfect product.

It is the object of my invention to overcome the objections mentioned, and this I do by supporting the said spindle-shaft bearings in such manner that they shall hold the gears in correct mesh and yet yield, so that they may at all times be kept in perfect alinement with the shaft, all as I will now proceed to describe and claim.

Reference is to be had to the annexed drawings, and to the letters marked thereon, forming a part of this specification, the same letters designating the same parts or features, as the case may be, wherever they occur.

Of the drawings, Figure 1 is a plan view of a spindle-shaft bearing, a portion of a spindle-shaft, and some of their adjuncts. Fig. 2 is a sectional side elevation of what is shown in Fig. 1 and some things in addition, showing the nature and design of my invention. Fig. 3 is a sectional detail view taken on the line 3 3 of Fig. 2. Fig. 4 is a side elevation of the bearing-holding pin.

In the drawings, $a$ designates the rail. $b$ is a bracket connected with the rail and constructed to form a support for the step $c$ of the spindle $d$ and to also form a base for the vertical support of a bearing $e$ for the spindle-shaft $f$. The spindle-shaft is provided with a bevel-gear, (indicated by the dotted lines $g$ in Fig. 2,) which gear meshes with and drives the gear $h$ on the spindle $d$.

Instead of making the bearing $e$ for the spindle-shaft rigid, as has heretofore been done, I support it so that it may yield slightly in any direction necessary to automatically put it in perfect alinement with the spindle-shaft and prevent any binding of the shaft in its bearings or other trouble incident to the shaft and its bearings.

The making of the spindle-shaft bearing so that it may yield to accommodate itself to the alinement of the shaft is the essential feature of the invention, and this end I have secured under various forms of means. That shown in the drawings has, however, been found to be quite efficient and will serve to give a clear idea of the invention.

The bearing $e$ is made separate from the bracket, which is provided on its upper side with a rib $i$, upon which the bearing may rest and rock, as is quite clearly shown in Fig. 3. The bearing has a lateral extension projecting forward beyond the step $c$, and a slightly-tapering hole $j$ is made vertically through said forwardly-projecting portion. A holding-pin $k$ extends through the hole $j$, said holding-pin extending also through a hole $l$, formed through the bracket $b$. A set-screw $m$, tapped into the bracket, is adapted to be turned up against the pin to hold it in place, and for this purpose the pin may be turned down, as at $n$, to reduce its diameter at the point where the screw $m$ acts against it. Under this form of parts it will be seen that the bearing *e* will be held in place to subserve all of its purposes in supporting the shaft and yet be allowed to yield to accommodate itself to the alinement of the shaft and prevent the hard running of the same and the imperfections in the work incident to unsteadiness of movement of the machine.

It is to be understood, of course, that the invention is applicable as well to bearings for the bobbin-shaft in roving-machines and to any other uses of which it is capable.

Having thus explained the nature of the invention and described a way of constructing and using the same, though without attempting to set forth all of the forms in which it may be made or all of the modes of its use, it is declared that what is claimed is—

In a machine of the character described, the combination, with the vertical spindle and the horizontal spindle-shaft, of a supporting-bracket having a step for the spindle above the horizontal shaft and a base below the said shaft, and extending forwardly beyond the same, a half-bearing for the horizontal shaft resting upon the said base and having a lateral extension projecting forwardly beyond the spindle-step and vertically apertured; and a pin fastened in the base and loosely engaging the aperture in the bearing, substantially as and for the purpose described.

In testimony whereof I have signed my name to this specification, in the presence of two subscribing witnesses, this 12th day of June, A. D. 1899.

WILLIAM V. THRELFALL.

Witnesses:
ARTHUR W. CROSSLEY,
ANNIE J. DAILEY.